(12) United States Patent  (10) Patent No.: US 8,111,429 B2
Kim et al.  (45) Date of Patent: Feb. 7, 2012

(54) APPARATUS AND METHOD FOR DITHERING FOR MULTI-TONING

(75) Inventors: Yun-tae Kim, Yongin-si (KR); Chang-yeong Kim, Yongin-si (KR); Heui-keun Choh, Yongin-si (KR); Du-sik Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1239 days.

(21) Appl. No.: 11/607,954

(22) Filed: Dec. 4, 2006

(65) Prior Publication Data

US 2007/0153332 A1    Jul. 5, 2007

(30) Foreign Application Priority Data

Jan. 4, 2006   (KR) .................. 10-2006-0001024

(51) Int. Cl.
*H04N 1/405*    (2006.01)

(52) U.S. Cl. ............. 358/3.13; 358/3.16; 358/3.18; 345/596; 345/599; 345/475; 345/605; 345/694

(58) Field of Classification Search ............ 358/3.16, 358/3.18, 3.14, 3.13; 345/596, 605, 694, 345/475, 599
See application file for complete search history.

(56) References Cited

U.S. PATENT DOCUMENTS

| | | | |
|---|---|---|---|
| 6,795,085 | B1 | 9/2004 | Doherty et al. |
| 7,099,049 | B2* | 8/2006 | Yu et al. ............ 358/3.26 |
| 2005/0021579 | A1* | 1/2005 | Bae et al. .......... 708/300 |

FOREIGN PATENT DOCUMENTS

| | | |
|---|---|---|
| JP | 2000-056726 A | 2/2000 |
| JP | 2000-293149 A | 10/2000 |
| JP | 2004-289236 A | 10/2004 |
| KR | 10-2003-0046099 A | 6/2003 |
| KR | 2005-0093327 A | 9/2005 |
| KR | 2005-0101442 A | 10/2005 |

OTHER PUBLICATIONS

Muge Wang et al Properties of Jointly-Blue Noise Masks and Applications to Color halftoning, Jul./Aug. 2000, Journal of Imaging Science and Technology, vol. 44 No. 4, pp. 360-370.*

* cited by examiner

*Primary Examiner* — King Poon
*Assistant Examiner* — Jamares Q Washington
(74) *Attorney, Agent, or Firm* — Sughrue Mion, PLLC

(57) ABSTRACT

A method and apparatus for dithering for multi-toning are provided. The apparatus includes a mask-pattern-generating unit that generates a mask pattern on R channel, G channel and B channel by selecting pattern values constituting the mask pattern on the channels based on randomly-determined seed values; a spatial-weight-determining unit that determines the weight for spatial dithering by using the pattern values and K-bit LSB data of the high-tone input image; and an output unit that outputs an M-bit image by applying the weight to M-bit input image data, exempting the K-bit LSB data, in a dithering apparatus for expressing an M+K bit high-tone input image in an M-bit low-tone output device.

21 Claims, 8 Drawing Sheets

FIG. 4

| LSB 2bit (Input data) | Weight | | | |
|---|---|---|---|---|
| | 1 frame | 2 frame | 3 frame | 4 frame |
| 01 | +1 | 0 | 0 | 0 |
| | 0 | 0 | +1 | 0 |
| 10 | +1 | 0 | +1 | 0 |
| | 0 | +1 | 0 | +1 |
| 11 | +1 | +1 | 0 | +1 |
| | 0 | +1 | +1 | +1 |

FIG. 5A
<8 bit → 4 bit>
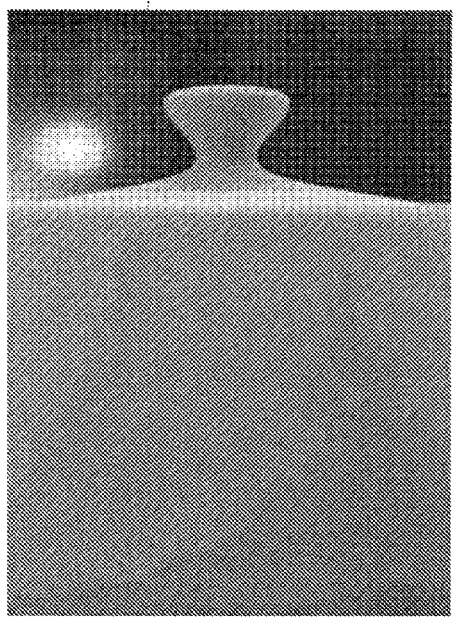
Truncation
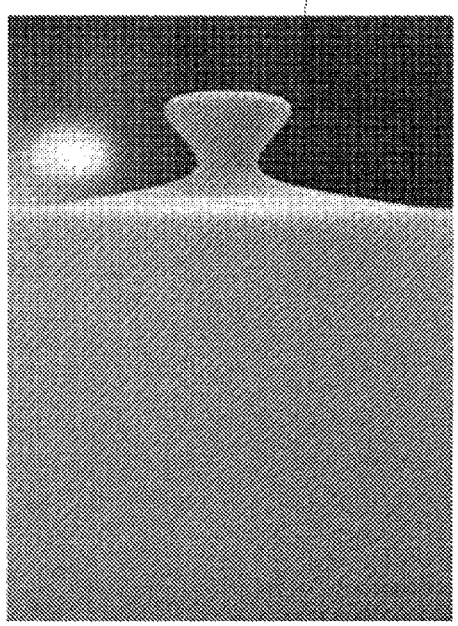
Random Dithering
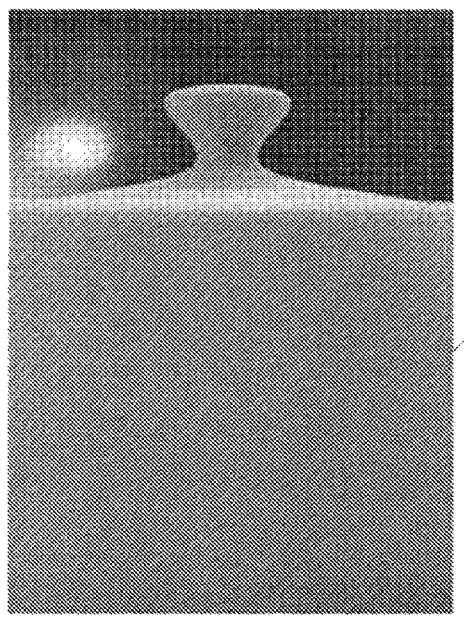
Dithering using the Invention <8 bit → 5 bit>

FIG. 5C
<8 bit → 6 bit>
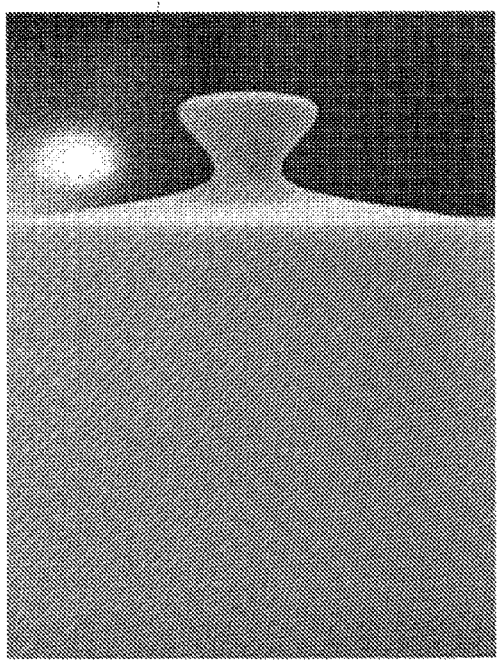
Truncation
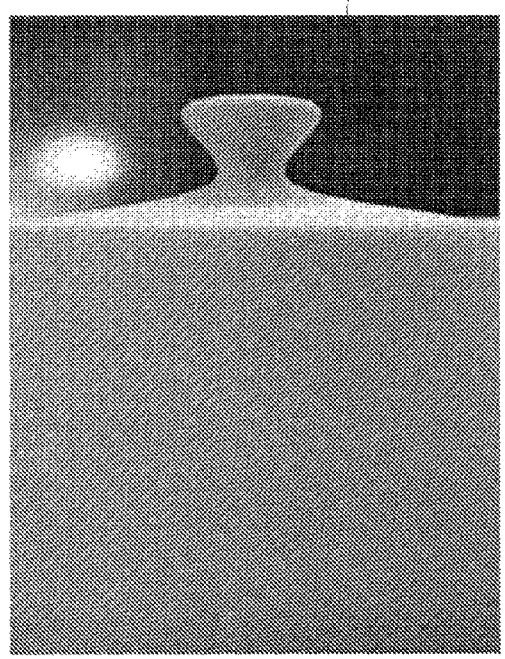
Random Dithering
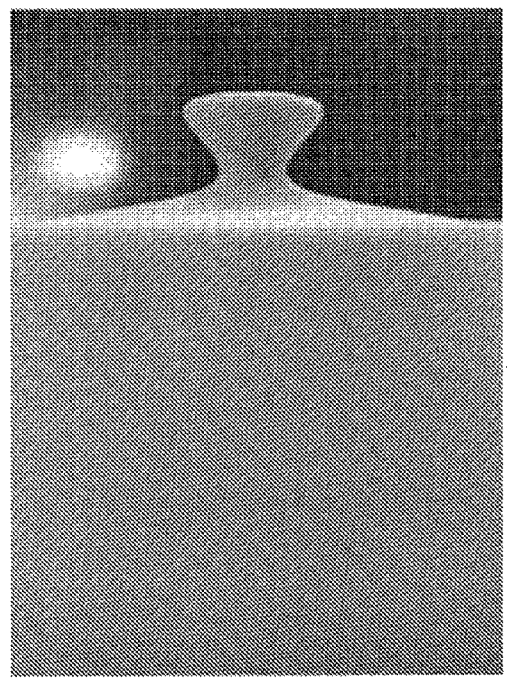
Dithering using the invention

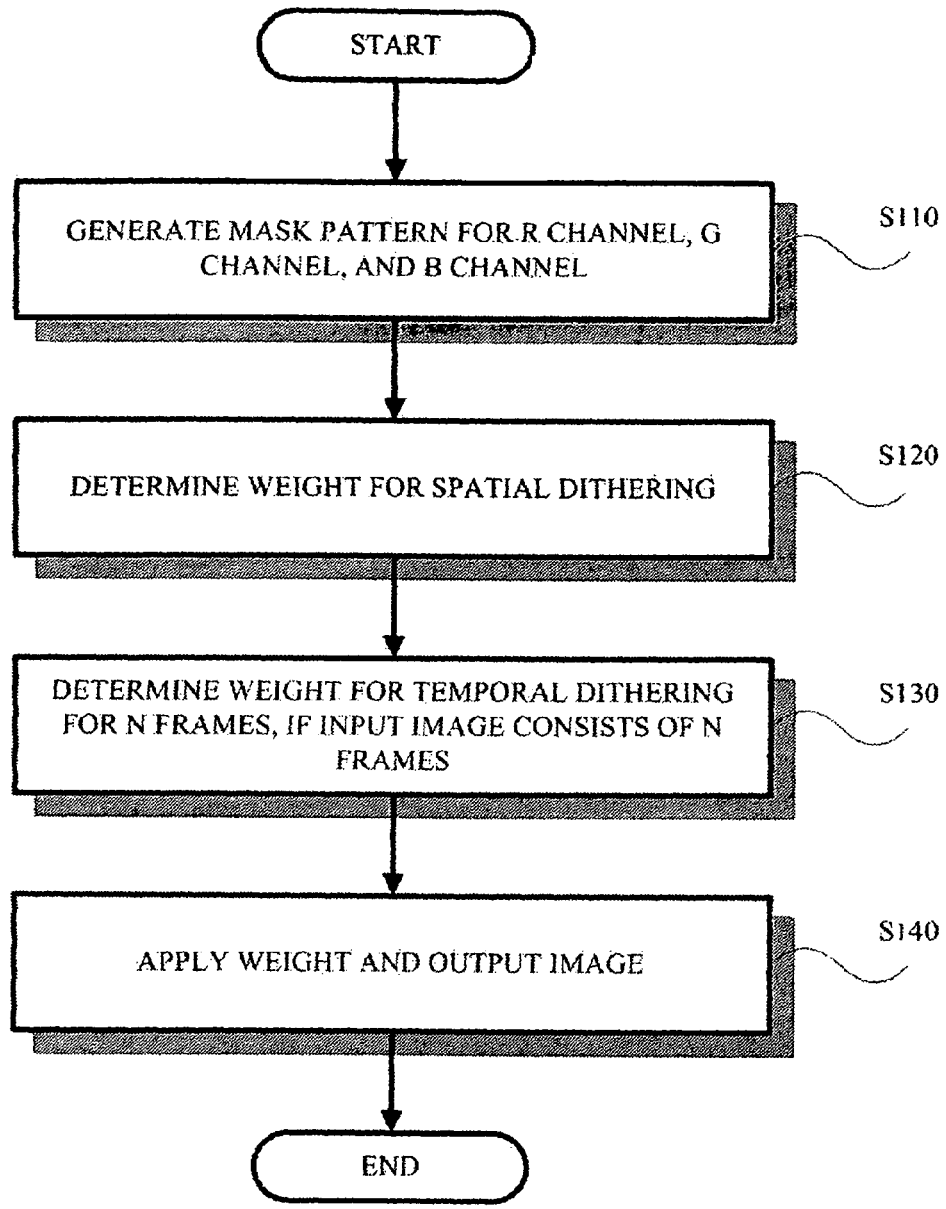

APPARATUS AND METHOD FOR DITHERING FOR MULTI-TONING

CROSS-REFERENCE TO RELATED APPLICATION

This application is based on and claims priority from Korean Patent Application No. 10-2006-0001024 filed on Jan. 4, 2006 in the Korean Intellectual Property Office, the disclosure of which is incorporated herein in its entirety by reference.

BACKGROUND OF THE INVENTION

1. Field of the Invention

Apparatuses and methods consistent with the present invention relate to dithering for multi-toning. More particularly, the present invention relates to dithering for multi-toning, which can express a high-tone input image on a low-tone output device of M bits through dithering the high-tone input image of M+K bits.

2. Description of the Related Art

Digital devices that reproduce colors, such as a monitor, a scanner, a printer, and others, have diverse functions, an improved quality, and are using color space or color models, which are different according to each field of use. The color models can be divided into device-dependent models and device-independent models. Device-dependent models include the RGB model, an additive color space model, and the CMYK color model, a subtractive color space model, and device-independent models include the CIE L*a*b model, the CIE XYZ model, the CIE LUV model, and others. The CIE color model has been decided by the ICI (International Commission on Illumination), which decides standards on illuminators. The CIE XYZ color model expresses RGB tri-stimulus values as XYZ, a set of different, positive tristimulus values. Further, The CMYK color space is used in the printing field, and the RGB color space is used in computer monitors.

Further, when a high-tone input image is expressed on a low-tone output device, if it is not possible to use required colors, a dithering technique, which expresses similar colors by mixing as a set of dots of different-tone colors, is usually used. For example, in a display device or printing device, the whole image can be expressed using gray tones according to the rate of gray-color dots and white-color dots within a certain surface of the image, or can be expressed as pink multi-tones. The dithering technique is mainly used to heighten the realism of an image and to make an uneven and rough contour unnoticeable in a low-resolution output device.

The related art dithering technique has been mainly used to express an input image signal at a higher resolution than the resolution of an output device, and a spatial dithering or spatial-temporal dithering technique has been used to accomplish this. Because related art technologies using spatial dithering add noise, generated by a random generator, to the least significant bit (LSB) of an input image signal, the quality of the image deteriorates, which is a problem. Further, because related art technologies using spatial-temporal dithering use the same process on the RGB channel as the method of generating a dithered signal by, adding input signals to a regular mask pattern, a channel-overlap artifact or others are generated, which is a problem.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

An aspect of the present invention provides an apparatus and method for dithering for multi-toning, which can output a high-quality image by using a multi-toning technique when displaying a high-tone input image in a low-tone output device.

The present invention is not limited to the technical aspects described above. Other aspects not described herein will be more definitely understood by those in the art from the following detailed description.

According to an exemplary embodiment of the present invention, there is provided an apparatus for dithering for multi-toning, the apparatus including a mask-pattern-generating unit that generates a mask pattern for the R channel, G channel and B channel by selecting pattern values constituting the mask pattern on the channels based on randomly-determined seed values; a spatial-weight-determining unit that determines the weight for spatial dithering by using the pattern values and K-bit LSB data of the input image; and an output unit that outputs an image of M-bit data by applying the weight to m-bit input image data exempting the K-bit LSB data, in a dithering apparatus for expressing the M+K bit high-tone input image in the M-bit low-tone output device.

According to an exemplary embodiment of the present invention, there is provided a method for dithering for multi-toning, the method including generating a mask pattern for the R channel, G channel and B channel by selecting pattern values constituting the mask pattern on the channels based on randomly-determined seed values; determining the weight for spatial dithering by using the pattern values and K-bit LSB data of the input image; and outputting an image of M-bit data by applying the weight to M-bit input image data exempting the K-bit LSB data, in a dithering method for expressing the M+K bit high-tone input image in the M-bit low-tone output device.

BRIEF DESCRIPTION OF THE DRAWINGS

The above and other aspects of the present invention will become apparent by describing in detail exemplary embodiments thereof with reference to the attached drawings in which:

FIG. 4 is a table illustrating a method of determining the spatial weight according to an exemplary embodiment of the present invention.

FIGS. 5A, 5B and 5C illustrate a comparison of output images according to an exemplary embodiment of the present invention.

FIG. 6 is a flow chart illustrating a dithering method for multi-toning according to an exemplary embodiment of the present invention.

DETAILED DESCRIPTION OF THE EXEMPLARY EMBODIMENTS OF THE INVENTION

Figure 1:
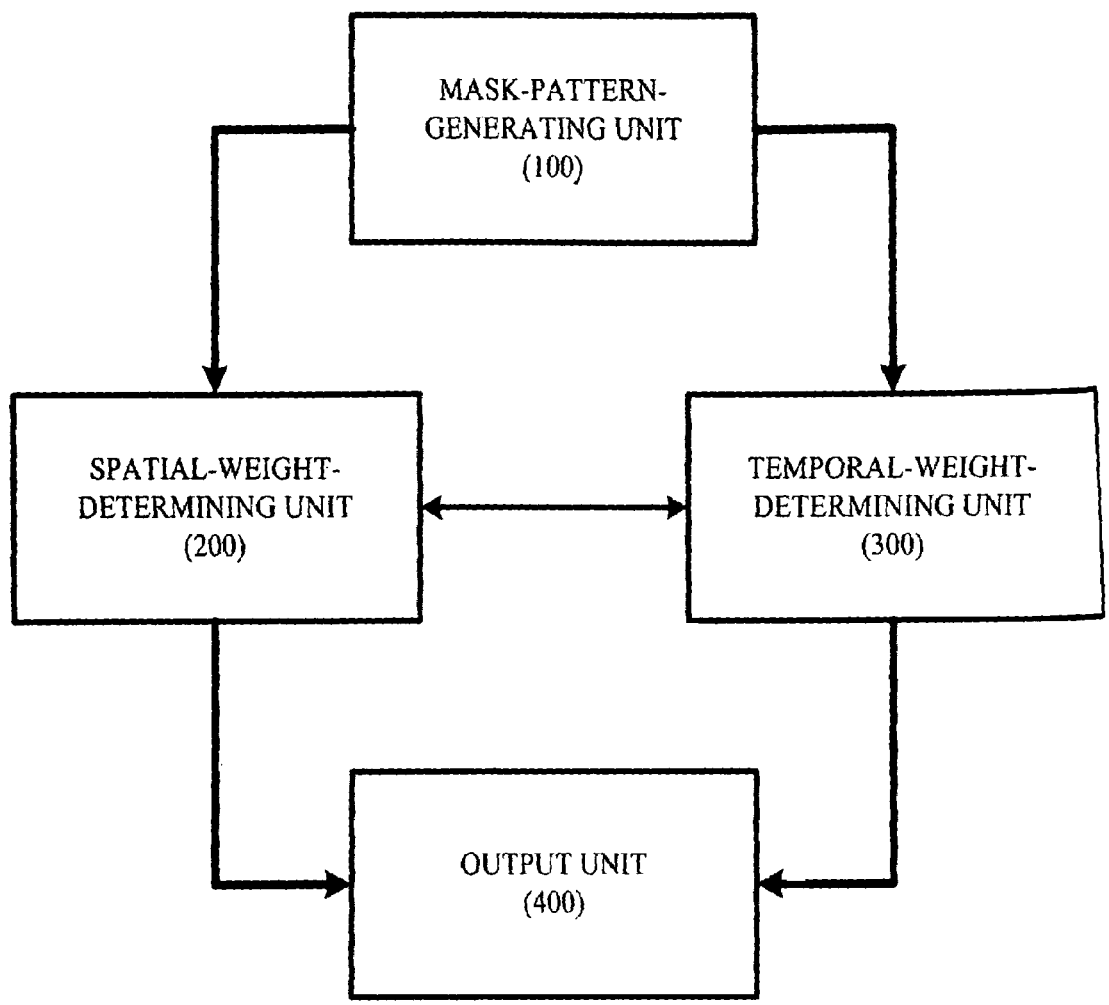
FIG. 1 illustrates the structure of a dithering apparatus for multi-toning according to an exemplary embodiment of the present invention.

Exemplary embodiments of the present invention will be described in detail with reference to the accompanying drawings.

Aspects of the present invention may be understood more readily by reference to the following detailed description of the exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention is defined by the appended claims. Like reference numerals refer to like elements throughout the specification.

FIG. 1 illustrates the structure of a dithering apparatus for multi-toning according to an exemplary embodiment of the present invention. Referring to FIG. 1, the dithering apparatus includes a mask-pattern-generating unit 100, a spatial-weight-determining unit 200, a temporal-weight-determining unit 300, and an output unit 400.

Because the exemplary embodiments of the present invention are mainly applied to a case that applies dithering to a high-tone input image of higher resolution than the resolution of an output device, then expresses the image in a low-tone output device, an exemplary embodiment of a case that expresses a high-tone input image of M+K bits in a low-tone output device of M bits is described here.

The mask-pattern-generating unit 100 generates mask patterns for an R channel, G channel and B channel. When selecting pattern values constituting the mask pattern, a seed value is first determined, and remaining pattern values are selected based on the seed value, thereby generating the mask pattern for the channels. The mask-pattern-generating unit is specifically described with reference to FIG. 2.

Figure 2:
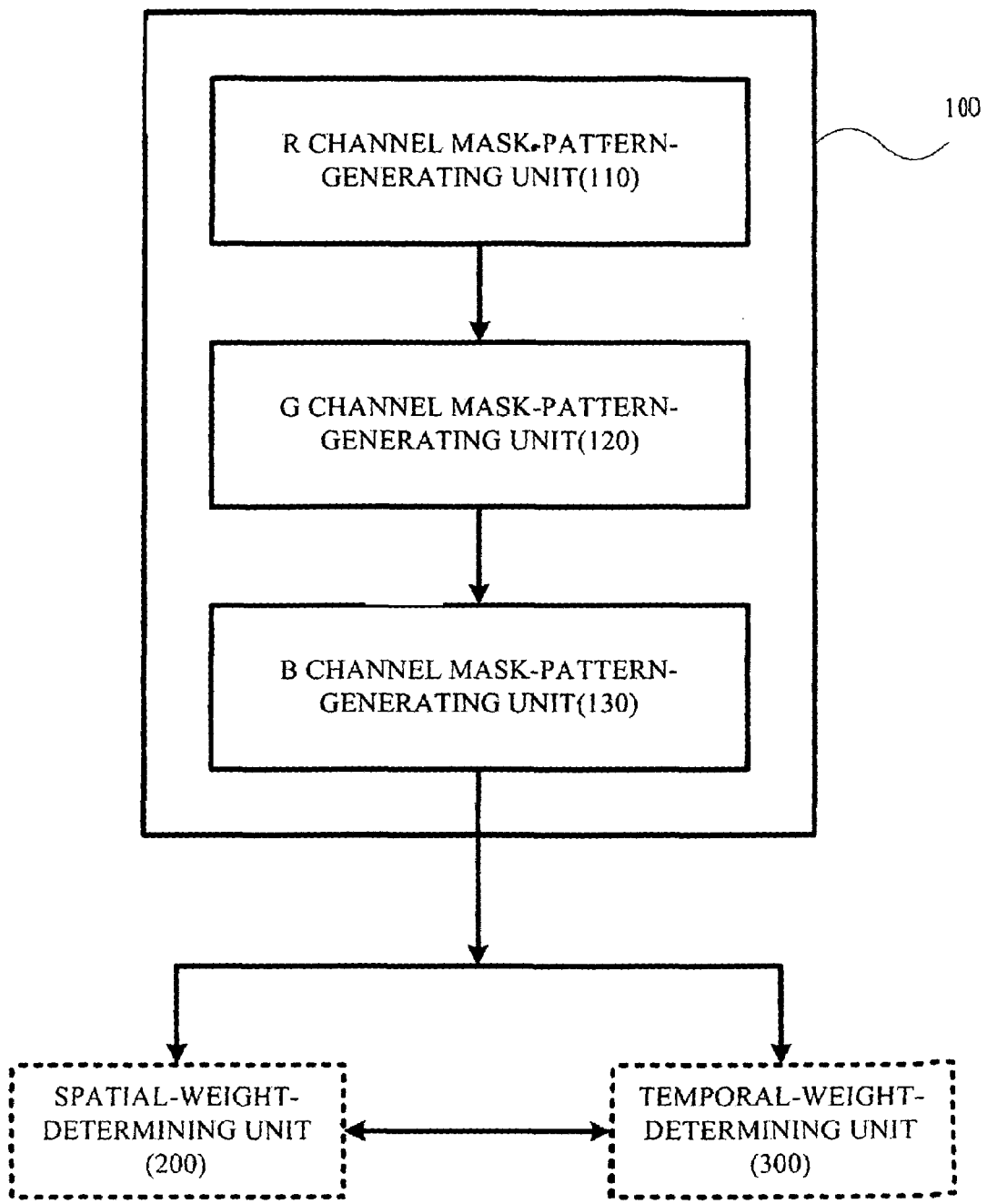
FIG. 2 illustrates the structure of a mask-pattern-generating unit according to an exemplary embodiment of the present invention.

FIG. 2 illustrates the structure of the mask-pattern-generating unit 100 according to an exemplary embodiment of the present invention. The mask-pattern-generating unit 100 includes the R channel mask-pattern-generating unit 110, the G channel mask-pattern-generating unit 120, and the B channel mask-pattern-generating unit 130.

First, the R channel mask-pattern-generating unit 110 randomly determines a seed value of the mask pattern of the R channel by a pseudo-random number generator. Here, the seed value is preferably, but not necessarily, set to a pattern value of row 1 and column 1 of the mask pattern. Remaining pattern values, except the seed value, are determined based on the determined seed value. For example, when K is 2, if the seed value, the coordinate value of (1, 1), is set to 2, remaining 0, 1, and 3 can be randomly arranged as (1, 2), (2, 1), and (2, 2). Here, remaining pattern values exempting the seed value, are preferably, but not necessarily, determined as a Bayer pattern value. Because a total of 4 seed values can be produced, a total of 4 mask patterns of the R channel will be generated. In other words, $2^K$ patterns of the R channel can be generated. Further, the process of determining the Bayer pattern value is already well-known to those in the art, and a detailed description is omitted here.

After the R channel mask pattern is generated, the G channel mask pattern is generated. The G channel mask-pattern-generating unit 120 generates the G channel mask pattern by inverting pattern values of the mask pattern of the R channel. For example, when K is 2, if coordinate values of pattern values of the mask pattern of the R channel are set to 2, 3, 1, 0, respectively in the order of (1, 1), (1, 2), (2, 2), and (2, 1), the pattern values of the mask pattern of the G channel will be determined as 1, 0, 2, 3, respectively in a clockwise direction from (1, 1). Because 2, the coordinate value of (1, 1) is $10_{(2)}$ in the binary scale, if numbers of each cipher are inverted, the number becomes $01_{(2)}$, and the pattern value of (1, 1) will be determined as 1. Likewise, because 3 of (1, 2) is $11_{(2)}$ in the binary scale, if numbers of each cipher are inverted, the number becomes $00_{(2)}$, and the pattern value of (1, 2) will be determined as 0. Further, because 1 of (2, 2) is $01_{(2)}$ in the binary scale, if numbers of each cipher are inverted, the, number becomes $10_{(2)}$, and the pattern value of (2, 2) will be determined as 2. Further, because 0 of (2, 1) is $00_{(2)}$ in the binary scale, if numbers of each cipher are inverted, the number becomes $11_{(2)}$, and the pattern value of (2, 1) will be determined as 3.

After the G channel mask pattern is generated, the B channel mask pattern is generated, and the B channel mask-pattern-generating unit 130 generates the B channel mask pattern by rotating pattern values of the mask pattern of the R channel by 90 degrees in a clockwise or counterclockwise direction. When K is 2, because coordinate values of pattern values of the mask pattern of the R channel are set to 2, 3, 1, 0, respectively in the order of (1, 1), (1, 2), (2, 2), (2, 1) which is a clockwise direction, the pattern values of the mask pattern of the B channel will be determined as 3, 1, 0, 2 (if rotated by 90 degrees in a counterclockwise direction) or 0, 2, 3, 1 (if rotated in a clockwise direction) from (1, 1).

Considering the number of mask patterns of each channel generated by the same above method, if K is 2, 4 ($=2^2$) mask patterns of type 2*2 will be generated, if K is 3, 8 ($=2^3$) mask patterns of type 2*4 or 4*2 will be generated, and if K is 4, 16($=2^4$) mask patterns of type 4*4 will be generated.

The case where K is 2 has been described in the above exemplary embodiment, but if K is 3 or more, the process becomes more complicated, and the present invention naturally includes cases where K is 3 or more.

In the above exemplary embodiment, the case where after the R channel mask pattern is generated, the G channel mask pattern is generated by inverting, and finally, the B channel mask pattern is generated by a rotation of 90 degrees has been described; however, because it is clear to those in the art that the present invention also includes a case where after the G channel mask pattern or the B channel mask pattern is first generated, the mask patterns of remaining channels are generated by inverting or a rotation of 90 degrees, the description is omitted here.

As described above, after pattern values of the mask pattern of each channel are determined, the weight for spatial dithering should be determined. Hence, the spatial-weight-determining unit 200 determines the weight for spatial dithering by using pattern values constituting the mask pattern generated by the mask-pattern-generating unit 100 and LSB data consisting of k bits of the input image.

Specifically, the spatial-weight-determining unit 200 can set the weight to 1 if the result value generated by adding the pattern values and K-bit LSB data of the input image is larger than the threshold, and can set the weight to 0 if the result value is equal to or less than the threshold. Here, the threshold is preferably, but not necessarily, set to $2^K-1$.

Continuing to describing the case where K is 2, pattern values of the mask pattern of the R channel are set to 2, 3, 1, 0 in the order of (1, 1), (1, 2), (2, 2), (2, 1) which is a clockwise direction, pattern values of the mask pattern of the G channel are set to 1, 0, 2, 3, respectively, and pattern values of the mask pattern of the B channel are set to 3, 1, 0, 2 in the above order (when rotated in a counterclockwise direction by 90 degrees). In this state, it is assumed that the two bits of LSB data, the LSB of the input image, is inputted by channels. Here, the threshold becomes $2^2-1$ (i.e., the threshold becomes 3). If 3 is inputted for the coordinate (1, 1) of the R channel, because the result values generated by adding 2, which is the pattern value of (1, 1) of the mask pattern of the R channel, to the input value becomes 5, which is larger than the threshold 3, the weight for the spatial dithering will be 1. If 3 is inputted for the coordinate (1, 1) of the G channel, because the result value generated by adding 1, which is the pattern value of (1, 1) of the mask pattern of the G channel, to the input value becomes 4, which is larger than the threshold 3, the weight for the spatial dithering will be 1. If 1 is inputted on the coordinate (2, 2) of the B channel, because the result value generated by adding 0, which is the pattern value of (2, 2) of the mask pattern of the B channel, to the input value becomes 1, which is less than the threshold 3, the weight for the spatial dithering will be 0.

Further, if the input image is a video consisting of consecutive still frames, because the input image includes N (where N>1) frames of a certain time interval, temporal dithering should also be considered. In other words, in order to consider the temporal weight, the temporal-weight-determining unit 300 determines the weight for temporal dithering by frames on the N frames by using the average value of the N frames.

Figure 3:
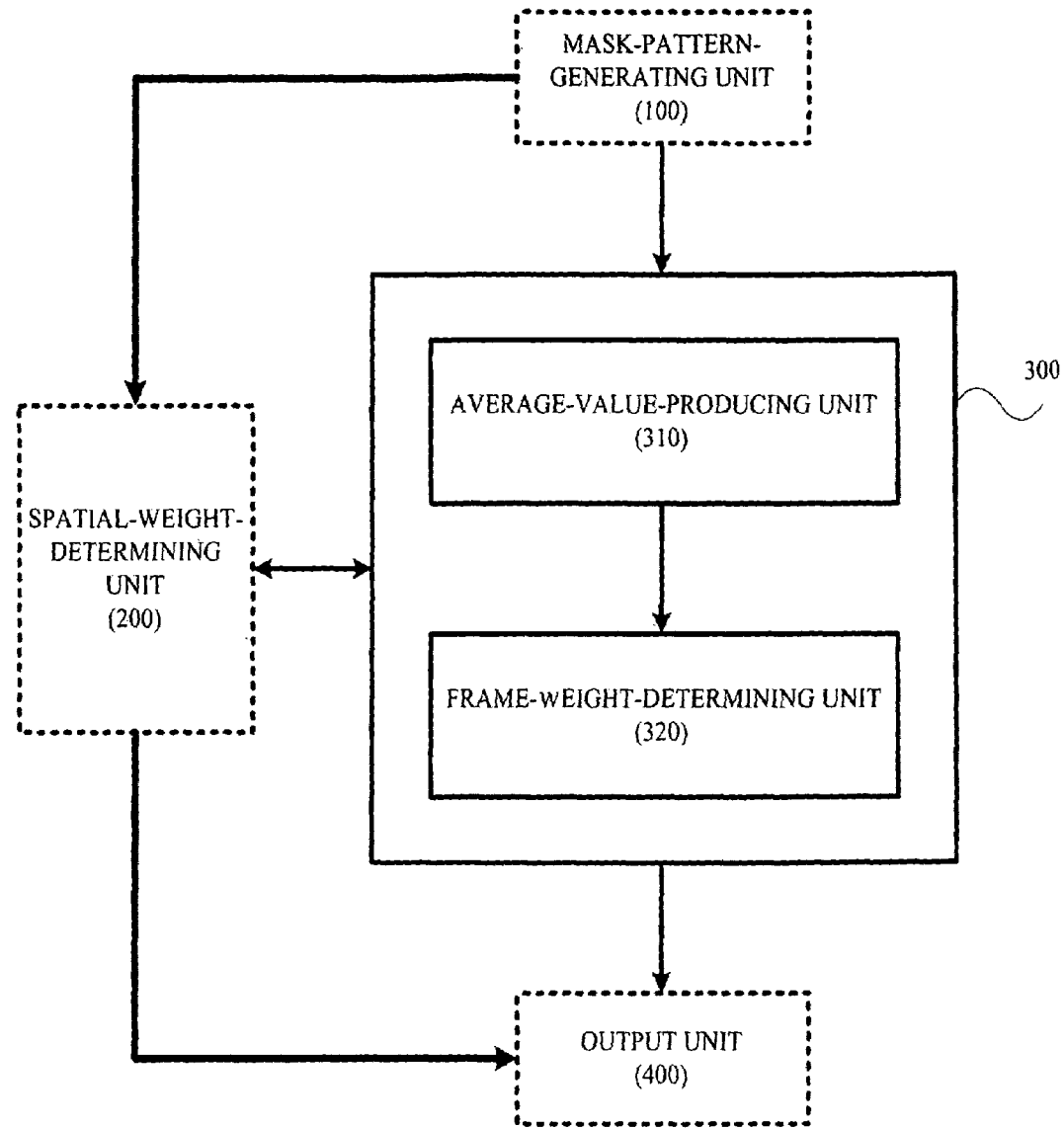
FIG. 3 illustrates the structure of a spatial-weight-determining unit according to an exemplary embodiment of the present invention.

The determination of the weight for the temporal dithering is described specifically with reference to FIGS. 3 and 4. FIG. 3 illustrates the structure of the temporal-weight-determining unit 300 according to an exemplary embodiment of the present invention, and FIG. 4 is a table illustrating a method of determining the temporal weight.

The average-value-producing unit 310 produces the average value of the N frames. The value, which is possible values of the K-bit LSB data of the image can have, is first set to an average value. In other words, values from 1 to $2^K-1$ can be produced as average values. For example, if K is 2, $01_{(2)}$, $10_{(2)}$, and $11_{(2)}$ can be average values. The frame-weight-determining 320 first determines the weight of the current time frame, and according to the weight of the determined current time frame, the weights of remaining N−1 frames are determined.

An example of a case where K is 2 is described with reference to FIG. 4. If the average-value-producing unit 310 produces an average value as $01_{(2)}$, the frame-weight-determining unit 320 should set the weight of only one frame among 4 frames as 1. Hence, if the weight of a first frame, the current frame, is set to 1, the temporal weights of remaining second to fourth frames will be all 0, and if the weight of the first frame is set to 0, the weight of one among second to fourth frames can be set to 1. In FIG. 4, the weight of the third frame has been set to 1.

Further, if the average-value-producing unit 310 produces the average value of $10_{(2)}$, the frame-weight-determining unit 320 should set the weights of two frames among 4 frames as 1 so as to keep the average temporal value. Hence, if the weight of a first frame, the current frame is set to 1, the temporal weight of a third frame is set to 1, and the weights of a second frame and a fourth frame will be 0, and if the weight of the first frame is set to 0, the weights of the second frame and the fourth frame can be set to 1, and the weight of the remaining third frame will be set to 0. Here, the temporal weights have not been set to 1 or 0 consecutively so as to prevent flickering of the image.

Further, if the average-value-producing unit 310 produces an average value of $11_{(2)}$, the frame-weight-determining unit 320 should set the weight of 3 frames among 4 frames to 1 so as to keep the temporal average value. Hence, if the weight of a first frame, the current frame, is set to 1, the temporal weights of remaining second to fourth frames will be 1, except one frame (in FIG. 4, the weight of a third frame is 0), and if the weight of the first frame is set to 0, the weights of all second to fourth frames will be set to 1.

After determining the weight for spatial dithering and the weight for temporal dithering, the weights should be applied to the output process. The output device 400 outputs the image of M-bit data by applying the weight determined of 0 or 1 to the M-bit input image data exempting the K-bit LSB data, among the input images. Here, if the weights are not applied, K bits among (M+K)-bit input image data are truncated, and M-bits of data is outputted as is, because excessive contours appear, the image quality deteriorates, but if other weights are given according to the value of the LSB data of K bits, or other weights are given per frame having a temporal interval, because contours are expressed by smooth tone, the image quality is improved. Hereinafter, a screen comparing an image outputted by the output device 400 by applying the weights and an image outputted by the related art is described with reference to FIGS. 5C, 5B and 5C.

Figure 5B:
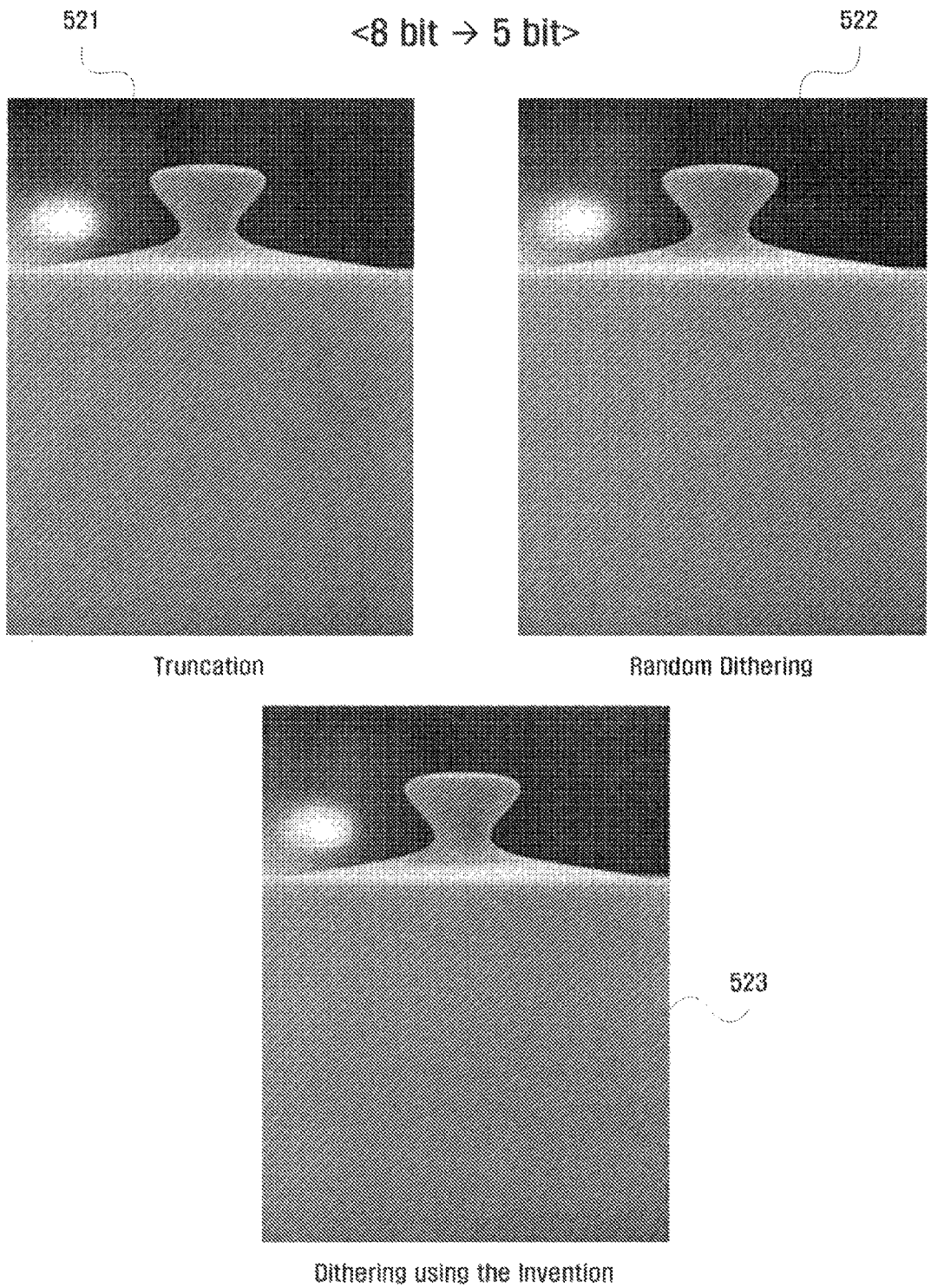

FIGS. 5A, 5B, and 5C compare an output image according to a related art and an output image according to an exemplary embodiment of the present invention.

FIG. 5A illustrates a case where an input image of 8 bits is expressed in an output device of 4 bits (i.e., in this case M=K=4). The 4 LSB bits of the upper-left picture 511 have been truncated so as to express 8-bit input image on a 4-bit output device. As shown in the picture 511, excessive contours occur. The upper-right picture 512 has applied a random dithering method that randomly selects and uses the pattern value of each mask pattern of R, G, and B channels as a dithering method according to a related art. The contour has been diminished, but the image is still not clear. The lower picture 513 outputs the image by dithering according to an exemplary embodiment of the present invention, and it is seen that the image is smooth and clear compared with the upper two pictures 511 and 512.

FIG. 5B illustrates a case where an 8-bit input image is expressed on a 5-bit output device (in other words, where M=5 and K=3). The 3 LSB bits of the upper-left picture 521 has been truncated so as to express the 8-bit input image on a 5-bit output device. An excessive contour is shown in the picture 521. The upper-right picture 522 shows the application of a random dithering method that randomly selects and uses the pattern value of each mask pattern of R, G, and B channels as a dithering method according to a related art. The contour has been diminished, but the image quality is still deteriorated compared with the lower picture 523 that shows the application of the dithering method according to an exemplary embodiment of the present invention. It can be seen that the lower picture 523 has the highest quality.

FIG. 5C illustrates a case where an 8-bit input image is expressed on a 6-bit output device (i.e., in a case where M=6 and K=2), in which the difference between the number of bits of an input image and the number of bits of an output image is 2, the contour has been diminished, compared with FIGS. 5A and 5B, and the image quality has been improved. The 2 LSB bits of the upper-left picture 531 has been truncated so as to express the 8-bit input image on a 6-bit output device, and a contour is still shown. The upper-right picture 532 shows the application of the dithering method that randomly selects and uses the pattern value of each mask pattern of R, G, and B channels as a dithering method according to a related art. The contour has been diminished, compared with the upper left picture 531, and it can be seen that the lower picture 533 outputted by applying the dithering method according to an exemplary embodiment of the present invention is smooth and is high quality, without contours or artifacts.

The term "unit," as used in this exemplary embodiment, refers to a hardware element such as a Field Programmable Gate Array (FPGA) or an Application Specific Integrated Circuit (ASIC), and a "unit" executes certain roles. A "unit" can be constituted, for example, to exist as addressable storage media, or can be constituted as one or more processors. Furthermore, a "unit" can also include, for example, software elements, object-oriented software elements, class elements, task elements, processes, functions, attributes, procedures, circuits, data, database, data structures, tables, arrays, and variables. Elements and functions provided in "units" can be combined into fewer elements or "units", or can be divided into additional elements and "units".

Hereinafter, an exemplary embodiment of the present invention is described with reference to FIG. 6. FIG. 6 is a flow chart illustrating a dithering method for multi-toning according to an exemplary embodiment of the present invention.

In a dithering method to express an input image of M+K bits on the M-bit output device (where M and K are integers>1, the mask-pattern-generating unit 100 generates a mask pattern for channels by selecting pattern values constituting the mask pattern on an R channel, a G channel, and a B channel, based on the randomly-determined seed value S100. The mask pattern is preferably, but not necessarily, generated in the order of the R channel mask pattern, the G channel mask pattern, and the B channel mask pattern, and the process of generating the mask pattern of each channel is explained specifically.

The R channel mask-pattern-generating unit 110 randomly determines the seed value of the mask pattern of the R channel by a pseudo-random number generator, and determines remaining pattern values, except the seed value, based on the determined seed value, thereby generating $2^K$ R channel mask patterns. Remaining pattern values exempting the seed value can be determined as Bayer pattern values. Here, if K is 2, 4 mask patterns of type 2*2 are generated, if K is 3, 8 mask patterns of type 2*4 or 4*2, and if K is 4, 16 mask patterns of type 4*4 are generated.

The G channel mask-pattern-generating unit 120 generates the G channel mask pattern by inverting pattern values of the mask pattern of the R channel, and the B channel mask-pattern-generating unit 130 generates the mask pattern of the B channel by rotating pattern values of the mask pattern of the R channel by 90 degrees in a clockwise or counterclockwise direction.

The spatial-weight-determining unit 200 determines the weight for spatial dithering by using the pattern values and the K-bit LSB data of the input image S120. Specifically, the spatial-weight-determining unit 200 sets the weight to 1 if the result value generated by adding up the pattern values and the K-bit LSB data of the input image is greater than a predetermined threshold, and sets the weight to 1 if the result value is equal to or less than the threshold. Here, the threshold is preferably, but not necessarily, set to $2^K-1$.

Further, if the input image is a video consisting of consecutive still frames, the input image includes N frames at regular time intervals, and in this structure, temporal dithering should be considered together. Hence, the temporal-weight-determining unit 300 determines the weight for the temporal dithering for the N frames, respectively, by using the average value of the N frames S130. Specifically, the average-value-producing unit 310 produces an average value of the N frames, which is a value between 1 and $2^K-1$, and which is a value the K-bit LSB data of the input image can be. Further, the frame-weight-determining unit 320 determines the weight of the current time frame by using the produced average value, and determines the weights of remaining N−1 frames according to the weight of the current time frame. Like the spatial weight, the temporal weight is 0 or 1, and especially if cases of setting the weight of the current time frame to 0 or 1 are separately considered, the weights of remaining frames can be conveniently determined.

Finally, the output unit 400 outputs an M-bit image by applying the weight to the M bits of input image data exempting the K-bit LSB data S140.

It should also be clear that the scope of the present invention includes a computer-readable recording medium that stores program code to execute such a method in a computer.

Further, it should be understood by those of ordinary skill in the art that various replacements, modifications and changes may be made in the form and details without departing from the spirit and scope of the present invention as defined by the following claims. Therefore, the above described exemplary embodiments are for purposes of illustration only and should not be construed as limiting the scope of the present invention.

According to an exemplary embodiment of the present invention, a smooth, high-quality image can be outputted, without showing a contour, when expressing a high-tone input image on, a low-tone output device such as the LCD, PDP, color printer, flexible display device, mobile display device, and others.

What is claimed is:

1. A dithering apparatus for expressing a high-tone input image of M+K bits, where M and K are integers >1, on a low-tone output device of M bits, the apparatus comprising:
   a mask-pattern-generating unit that generates one mask pattern for an R channel, a G channel or a B channel by selecting pattern values constituting the mask pattern based on randomly-determined seed values, and generates two other mask patterns, one by inverting pattern values of the generated mask pattern and another by rotating pattern values of the generated mask pattern;
   a spatial-weight-determining unit that determines a spatial weight for spatial dithering by using the pattern values and K-bit least significant bit (LSB) data of the high-tone input image; and
   an output unit that outputs an M-bit image by applying the spatial weight to M-bit input image data, exempting the K-bit LSB data, in a dithering apparatus for expressing the M+K bit high-tone input image in the M-bit low-tone output device.

2. The apparatus of claim 1, wherein the mask-pattern-generating unit comprises:
   an R channel mask-pattern-generating unit that generates 2K mask patterns by randomly determining a seed value of the mask pattern of the R channel, and determining remaining pattern values, except the seed value, based on the determined seed value;
   a G channel mask-pattern-generating unit that generates the G channel mask pattern by inverting pattern values of the mask pattern of the R channel; and
   a B channel mask-pattern-generating unit that generates the mask pattern of the B channel by rotating pattern values of the mask pattern of the R channel by 90 degrees in a clockwise or counterclockwise direction.

3. The apparatus of claim 2, wherein the R channel mask-pattern-generating unit generates 4 mask patterns of type 2*2 if K is 2, generates 8 mask patterns of type 2*4 or 4*2 if K is 3, and 16 mask patterns of type 4*4 if K is 4.

4. The apparatus of claim 2, wherein the R channel mask-pattern-generating unit determines remaining pattern values, except the seed value, as a Bayer pattern value.

5. The apparatus of claim 1, wherein the spatial-weight-determining unit sets the spatial weight to 1 if a sum of the pattern values and the K-bit LSB data of the high-tone input image is larger than a threshold, and sets the spatial weight to 0 if the result value is equal to or less than the threshold.

6. The apparatus of claim 5, wherein the threshold is 2K−1.

7. The apparatus of claim 1, further comprising:
a temporal-weight-determining unit that determines a temporal weight for temporal dithering for the N frames, respectively, using a average value of the N frames, if the high-tone input image comprises N frames, where N is an integer >1, at regular time intervals.

8. The apparatus of claim 7, wherein the temporal-weight-determining unit comprises:
an average-producing unit that produces the average value of the N frames as being between 1 and 2K−1, wherein the K-bit LSB data of the high-tone input image equals the average value; and
a frame-weight-determining unit that determines the temporal weight of a current time frame by using the average value, and determines the temporal weight of remaining N−1 frames according to the temporal weight of the current time frame.

9. The apparatus of claim 8, wherein the temporal weight of the current time frame is 0 or 1.

10. The apparatus of claim 2, wherein the seed value is a value at row 1 and column 1 of the mask pattern.

11. A dithering method for expressing a high-tone input image of M+K bits, where M and K are integers >1, on a low-tone output device of M bits, the method comprising:
generating one mask pattern for an R channel, a G channel or a B channel by selecting pattern values constituting the mask pattern based on randomly-determined seed values, and generating two other mask patterns, one by inverting pattern values of the generated mask pattern and another by rotating pattern values of the generated mask pattern;
determining a spatial weight for spatial dithering by using the pattern values and K-bit least significant bit (LSB) data of the high-tone input image; and
outputting an M-bit image by applying the weight to the M-bit input image data, exempting the K-bit LSB data, in a dithering apparatus for expressing the M+K bit high-tone input image in the M-bit low-tone output device.

12. The method of claim 11, wherein the generating of the mask pattern comprises:
generating 2K mask patterns by randomly determining a seed value of the mask pattern of the R channel and determining remaining pattern values, exempting the seed value, based on the determined seed value;
generating the G channel mask pattern by inverting pattern values of the mask pattern of the R channel; and
generating the mask pattern of the B channel by rotating pattern values of the mask pattern of the R channel by 90 degrees in a clockwise or counterclockwise direction.

13. The method of claim 12, wherein the generating of the R channel mask pattern generates 4 mask patterns of type 2*2 if K is 2, generates 8 mask patterns of type 2*4 or 4*2 if K is 3, and 16 mask patterns of type 4*4 if K is 4.

14. The method of claim 12, wherein the R channel mask-pattern-generating unit determines remaining pattern values, except the seed value, as a Bayer pattern value.

15. The method of claim 11, wherein the spatial-weight-determining unit sets the weight to 1 if a sum of the pattern values and the K-bit LSB data of the high-tone input image is greater than a threshold, and sets the weight to 0 if the result value is equal to or less than the threshold.

16. The method of claim 15, wherein the threshold is 2K−1.

17. The method of claim 11, further comprising:
determining the weight for temporal dithering for the N frames, respectively, using the average value of the N frames, if the high-tone input image comprises N, frames, where N is an integer >1, at regular time intervals.

18. The method of claim 17, wherein the determining of the temporal weight comprises:
producing the average value of the N frames as being between 1 and 2K−1, wherein the K-bit LSB data of the high-tone input image equals the average value; and
determining the weight of a current time frame by using the average value, and determining the weight of remaining N−1 frames according to the weight of the current time frame.

19. The method of claim 18, wherein the weight of the current time frame is 0 or 1.

20. The method of claim 12, wherein the seed value is a value at row 1 and column 1 of the mask pattern.

21. A non-transitory computer-readable recording medium storing a computer program for executing a dithering method for expressing a high-tone input image of M+K bits, where M and K are integers >1, on a low-tone output device of M bits, the dithering method comprising:
generating one mask pattern for an R channel, a G channel or a B channel by selecting pattern values constituting the mask pattern based on randomly-determined seed values, and generating two other mask patterns, one by inverting pattern values of the generated mask pattern and another by rotating pattern values of the generated mask pattern;
determining a spatial weight for spatial dithering by using the pattern values and K-bit least significant bit (LSB) data of the high-tone input image; and
outputting an M-bit image by applying the weight to the M-bit input image data, exempting the K-bit LSB data, in a dithering apparatus for expressing the M+K bit high-tone input image in the M-bit low-tone output device.

* * * * *